United States Patent
Shih et al.

(10) Patent No.: US 10,459,289 B2
(45) Date of Patent: Oct. 29, 2019

(54) DISPLAY DEVICE

(71) Applicant: InnoLux Corporation, Miao-Li County (TW)

(72) Inventors: Ming-Chia Shih, Miao-Li County (TW); Cheng-Jen Chu, Miao-Li County (TW); Chung-Kuang Wei, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 27 days.

(21) Appl. No.: 15/724,293

(22) Filed: Oct. 4, 2017

(65) Prior Publication Data

US 2018/0120639 A1 May 3, 2018

Related U.S. Application Data

(60) Provisional application No. 62/416,679, filed on Nov. 2, 2016.

(30) Foreign Application Priority Data

Feb. 21, 2017 (CN) .......................... 2017 1 0092767

(51) Int. Cl.
*G02F 1/1335* (2006.01)
*G02F 1/1347* (2006.01)

(52) U.S. Cl.
CPC ...... *G02F 1/133603* (2013.01); *G02F 1/1347* (2013.01); *G02F 1/13471* (2013.01); *G02F 1/133504* (2013.01); *G02F 1/133606* (2013.01); *G02F 2001/133613* (2013.01)

(58) Field of Classification Search
CPC ................... G02F 2001/133601; G02F 1/1347
See application file for complete search history.

(56) References Cited

U.S. PATENT DOCUMENTS

| | | | | |
|---|---|---|---|---|
| 2002/0101549 A1* | 8/2002 | Katsu | ................... | G02B 6/0031 349/65 |
| 2009/0268434 A1* | 10/2009 | Mita | ................. | G02F 1/133603 362/97.1 |
| 2009/0303419 A1* | 12/2009 | Koma | ................... | D02F 1/1347 349/74 |
| 2012/0105509 A1* | 5/2012 | Ito | ..................... | G02F 1/133603 345/690 |
| 2013/0308075 A1* | 11/2013 | Watanabe | ......... | G02F 1/133308 349/61 |
| 2014/0049734 A1* | 2/2014 | Erinjippurath | ....... | G09G 3/3611 349/96 |
| 2015/0253623 A1* | 9/2015 | Lee | .................. | G02F 1/135504 349/64 |

(Continued)

*Primary Examiner* — Alexander P Gross

(74) *Attorney, Agent, or Firm* — McClure, Qualey & Rodack, LLP

(57) ABSTRACT

A display device includes a backlight plate, a first panel and a second panel. The backlight plate includes a plurality of light emission zones. The first panel is disposed on the backlight plate, and the first panel includes a plurality of first pixels. The second panel is disposed on the first panel, and the second panel includes a plurality of second pixels. A diffusion plate disposed between the first panel and second panel. A number of light emission zones is less than or equal to a number of first pixels. The number of first pixels is less than a number of second pixels.

18 Claims, 8 Drawing Sheets

(56) References Cited

U.S. PATENT DOCUMENTS

| | | | |
|---|---|---|---|
| 2016/0042701 A1* | 2/2016 | Furumoto | G09G 3/3426 345/694 |
| 2018/0031897 A1* | 2/2018 | Kikuchi | G02F 1/133504 |
| 2018/0120659 A1* | 5/2018 | Kim | G02F 1/136286 |

* cited by examiner

DISPLAY DEVICE

CROSS REFERENCE TO RELATED APPLICATIONS

This application claims the benefit of U.S. Provisional Application No. 62/416,679 filed on Nov. 2, 2016, which application is hereby incorporated by reference in its entirety This Application claims priority of China Patent Application No. 201710092767.5, filed on Feb. 21, 2017, the entirety of which is incorporated by reference herein.

BACKGROUND OF THE DISCLOSURE

Field of the Disclosure

The disclosure relates to an electronic device, and more particularly relates to a display device.

Description of the Related Art

Flat panel displays are widely used because flat panel displays are provided with some favorable advantages, these advantages include thin volume, light weight, or low radiation. Different flat panel displays of display mediums are different. The display mediums can be classified into self-luminous mediums or non-self-luminous mediums. The self-luminous mediums comprise organic light-emitting diode (OLED), or plasma. The non-self-luminous mediums comprise liquid crystal. In the conventional method, a backlight plate serving as a light source in a display for the displays with non-self-luminous mediums. However, the backlight plate is always turned on, and the backlight plate consumes a great amount of power.

BRIEF SUMMARY OF THE DISCLOSURE

In accordance with an embodiment, a display device comprises a backlight plate, a first panel and a second panel. The backlight plate comprises a plurality of light emission zones. The first panel is disposed on the backlight plate and comprises a plurality of first pixels. The second panel is disposed on the first panel and comprises a plurality of second pixels. A diffusion plate is disposed between the first panel and second panel. A number of the light emission zones is less than or equal to a number of the first pixels. The number of the first pixels is less than a number of the second pixels.

BRIEF DESCRIPTION OF THE DRAWINGS

The disclosure can be more fully understood by referring to the following detailed description and examples with references made to the accompanying drawings, wherein.

DETAILED DESCRIPTION OF THE DISCLOSURE

Figure 1:
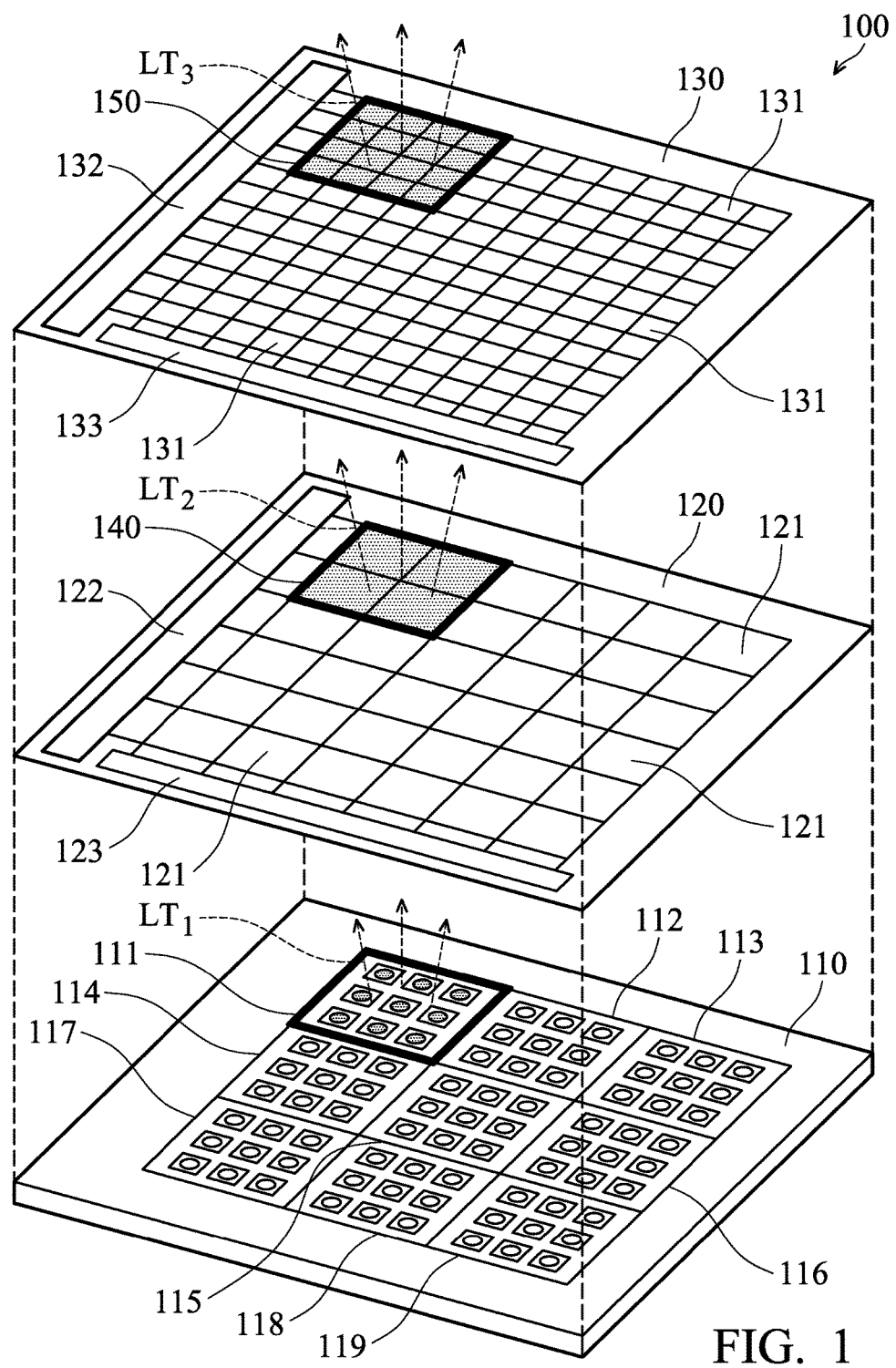
FIG. 1 is a schematic diagram of an exemplary embodiment of a display device, according to various aspects of the present disclosure.

The display device of the present disclosure and the structure of the display device are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first material layer disposed on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

FIG. 1 is a schematic diagram of an exemplary embodiment of a display device, according to various aspects of the present disclosure. The display device 100 comprises a backlight plate 110, a first panel 120 and a second panel 130. In one embodiment, the display device 100 may be flexible. In another embodiment, the first panel 120 or the second panel 130 comprises a 3D glass. In this case, the 3D glass may be a curved glass having one or more curvatures. The disclosure is not limit the application field of the display device 100. In one embodiment, the display device 100 is applied in personal digital assistant (PDA), cellular phone, digital camera, television, global positioning system (GPS), car display, avionics display, digital photo frame, notebook computer or personal computer, or other suitable applications.

The backlight plate 110 comprises a plurality of luminescent elements. In the disclosure, the kind of luminescent elements is not limited. In one embodiment, the luminescent elements may use inorganic materials, such as light-emitting diodes (LEDs), micro LEDs, mini LEDs. Detailed description, LED chip size may be defined as the existing chip about 200 to 300 microns, LED chip size of small pitch display chip may be about 150 microns, and LED chip size of mini LED may be about 50 to 60 microns, and mini LED may be regarded as micro LED predecessor, and LED chip size of micro LED may be only 15 microns.

In other embodiment, the luminescent elements may use organic materials, such as Organic Light-Emitting diodes (OLEDs). OLEDs can make the backlight plate thinner and can be bent at will. In this embodiment, the luminescent elements are divided into light emission modules 111~119. Each of the light emission modules 111~119 comprises nine luminescent elements, but the disclosure is not limited thereto. In other embodiments, the number of luminescent elements of one of the light emission modules 111~119 is the same as or different from the number of luminescent elements of another of the light emission modules 111~119. In this embodiment, each light emission module serves as a light emission zone.

In the disclosure, the arranged sequence of the luminescent elements is not limited. In this embodiment, the arrangements of the luminescent elements of one of the light emission modules 111~119 are the same, but the disclosure is not limited thereto. In other embodiment, the arrangement of the luminescent elements of one of the light emission modules 111~119 is different from the arrangement of the luminescent elements of another of the light emission modules 111~119. In this embodiment, the backlight plate 110 controls the luminescent elements of the light emission modules 111~119 according to a local dimming technology. Therefore, each light emission module is individually activated by the backlight plate. For example, when the luminescent elements of the first light emission module 111 are activated, at least one of the luminescent elements of the light emission modules 112~119 are deactivated. Since the luminescent elements of a portion of the light emission modules are activated, the power consumption of the backlight plate 110 can be reduced or the contrast ration of the backlight plate 110 is increased. In other embodiments, when the luminescent elements of the first light emission module 111 are activated, the luminescent elements in at least one of the light emission modules 112~119 are activated. In this case, the brightness of the second light emission module 112 is lower than the brightness of the first light emission module 111. In some embodiments, the brightness of the second light emission module 112 is the same as the brightness of the first light emission module 111. In one embodiment, the number of activated luminescent elements in the second light emission module 112 is less than the number of activated luminescent elements in the first light emission module 111.

Additionally, the brightness of each of the light emission modules 111~119 is individually controlled. For example, the luminescent elements of the first light emission module 111 are activated according to a driving signal, such as a current signal. In this case, the brightness of the luminescent elements in the first light emission module 111 is controlled by the amplitude or the duty cycle of the driving signal. In one embodiment, the driving signal is a current signal or a voltage signal, but the disclosure is not limited thereto. For brevity, the light emitted from the first light emission module 111 is referred to as specific light $LT_1$.

As shown in FIG. 1, the first panel 120 is disposed on the backlight plate 110 and comprises a plurality of first pixels 121. In one embodiment, the shape of the first panel 120 may be rectangular, polygonal, curve, or other suitable shapes, but the disclosure is not limited thereto. In other embodiments, the shape of the first panel 120 is not rectangular. In some embodiments, the first panel 120 is flexible, but the disclosure is not limited thereto. In other embodiments, each of the first pixels corresponds to a light emission module. in other embodiments, many first pixels correspond to one light emission module. For example, the region 140 of the first panel 120 comprises four first pixels corresponding to the first light emission module 111, but the disclosure is not limited thereto. Therefore, when the specific light LT1 is emitted from the first light emission module 111, the specific light LT1 passes through the four first pixels in the region 140. In other embodiments, the transmittance of the light through the first pixels of the region 140 is higher than the transmittance of the light through the other first pixels when the specific light LT1 passes through the first pixels of the region 140 and the other first pixels disposed out of the region 140. In this embodiment, each of the four first pixels in the region 140 is capable of controlling the transmittance of the light passing through it. When the specific light LT1 passes through the four first pixels in the region 140, the four first pixels in the region 140 form a light emission module. For brevity, the light passing through the first pixels of the region 140 is referred to as light LT2.

In one embodiment, the first panel 120 comprises a first data driver 122 and a first scan driver 123. The first scan driver 123 provides a plurality of scan signals to turn on the corresponding first pixels. The first data driver 122 provides a plurality of data signals. Each data signal controls the transmittance of the light passing through the corresponding first pixels. For example, the transmittance of the light passing through the first pixels of the region 140 is controlled by controlling the brightness of the light $LT_2$ passing through the first pixels of the region 140. In the disclosure, the kind of first panel 120 is not limited. In one embodiment, the first panel 120 may be a liquid crystal display (LCD), but the disclosure is not limited thereto. Any display panel can serve as the first panel 120, as long as the display panel needs a light source provided by a backlight plate.

In this embodiment, the colors of the lights passing through the first pixels 121 are the same as the color of the lights emitted from the backlight plate 110. The color of the light emitted from the backlight plate 110 is white. Since the first panel 120 is utilized to regulate the transmittances of the lights passing through the first pixels 121, the first panel 120 does not need a color filter. In this embodiment, the number of first pixels 121 is not limited. In one embodiment, the number of light emission zones of the backlight plate 110 is less than or equal to the number of first pixels of the first panel 120. In other words, the resolution of the backlight plate 110 in pixels per inch (PPI) is less than or equal to the resolution of the first panel 120 in pixels per inch.

The second panel 130 is disposed on the first panel 120 and comprises a plurality of second pixels 131. In one embodiment, the shape of the second panel 130 may be rectangular, polygonal, curve, or other suitable shapes, but the disclosure is not limited thereto. In other embodiments, the shape of the second panel 130 is not rectangular. Additionally, the second panel 130 is flexible, but the disclosure is not limited thereto. In one embodiment, one of the second pixels 131 corresponds to one of the first pixels 121. In another embodiment, a portion of the second pixels 131 corresponds to one of the first pixels 121.

For example, assuming that the second panel 130 comprises a region 150 comprising sixteen second pixels. The sixteen second pixels in the region 150 correspond to the four first pixels in the region 140 of the first panel 120, but the disclosure is not limited thereto. Therefore, the light $LT_2$ passing through the four first pixels in the region 140 also passes the sixteen second pixels in the region 150. In this case, four second pixels in the region 150 correspond to one of the four first pixels in the region 140. For brevity, the light passing through the four second pixels of the region 150 is referred to as light $LT_3$.

In one embodiment, the second panel 130 comprises a second data driver 132 and a second scan driver 133. The second driver 133 provides a plurality of scan signals to turn on a portion of the second pixels 131. The second data driver 132 provides a plurality of data signals. Each of the data signals is utilized to control the transmittance of the light passing through corresponding second pixels. Therefore, the intensity of the light $LT_3$ is controlled according to the transmittance of the light passing through the second pixels in the region 150.

In one embodiment, the second panel 130 may be a liquid crystal display, but the disclosure is not limited thereto. In other embodiments, any display panel can serve as the second panel 130, as long as the display panel needs a light source emitted from a backlight plate. In one embodiment, a quantum dot (QD) display serves as the second panel 130, for example, a quantum dot (QD) film may be coating on the substrate of the second panel, or the quantum dot (QD) Film may dispose on the second panel, and the quantum dot (QD) display has wider color gamut performance, but the disclosure is not limited thereto. Furthermore, in the embodiment, the colors of the lights emitted from the second panel 130 may be red, green, blue or white. In this case, the second panel 130 comprises a color filter. In one embodiment, each of the second pixels 131 serves as a sub-pixel to display red light, green light, blue light or white light. In another embodiment, each of the second pixels 131 is a pixel comprising three sub-pixels. In the present disclosure, the number of second pixels 131 is not limited. In one embodiment, the number of first pixels 121 is less than the number of second pixels 131. In this case, the resolution of the first panel 120 in PPI is less than the resolution of the second panel 130 in PPI.

Figure 2A:
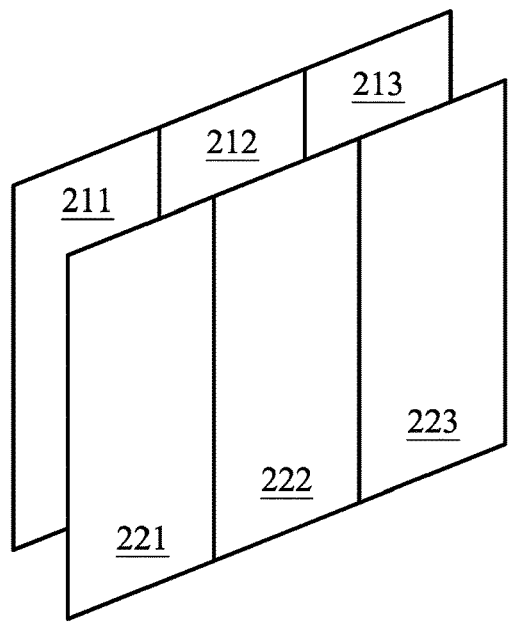
FIG. 2A is a schematic diagrams of exemplary embodiments of corresponding relationships between first pixels and second pixels, according to various aspects of the present disclosure.
Figure 2B:
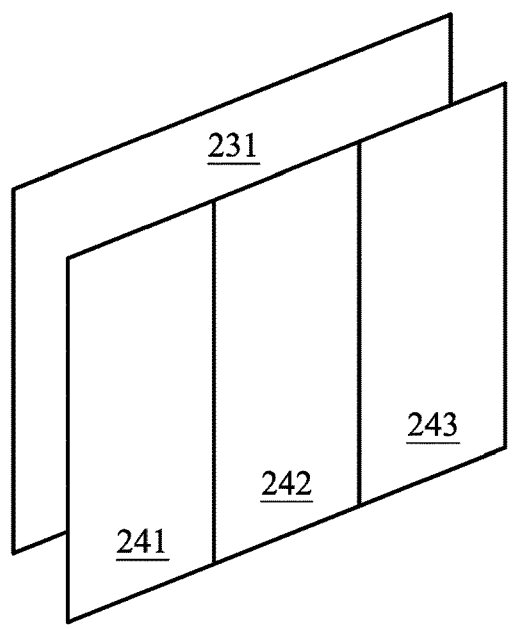
FIG. 2B is a schematic diagrams of exemplary embodiments of corresponding relationships between first pixels and second pixels, according to various aspects of the present disclosure.
Figure 2C:
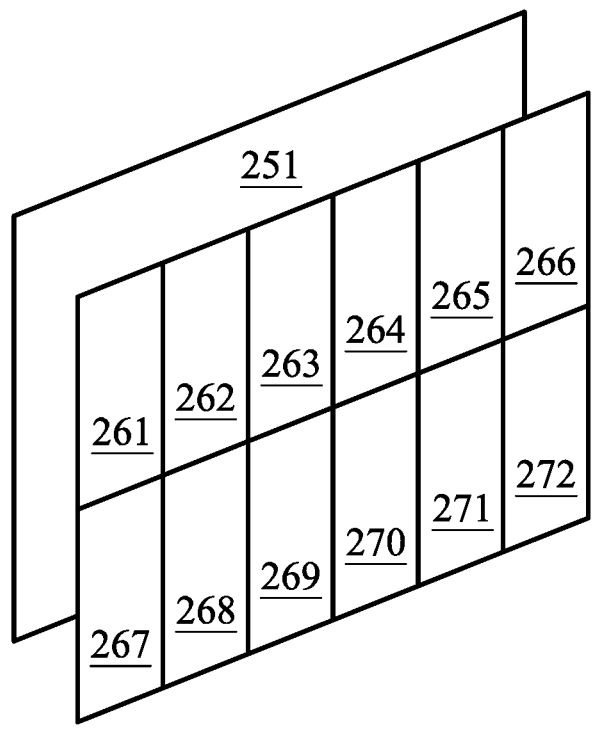
FIG. 2C is a schematic diagrams of exemplary embodiments of corresponding relationships between first pixels and second pixels, according to various aspects of the present disclosure.

FIGS. 2A-2C are schematic diagrams of exemplary embodiments of corresponding relationships between the first pixels and the second pixels, according to various aspects of the present disclosure. Refer to FIG. 2A, the symbols 211~213 represent the first pixels of the first panel 120, and the symbols 221~223 represent the second pixels of the second panel 130. As shown in FIG. 2A, each of the first pixels corresponds to one of the second pixels. For example, the first pixel 211 corresponds to the second pixel 221, the first pixel 212 corresponds to the second pixel 222, and the first pixel 213 corresponds to the second pixel 223. In this case, the second pixels 221~223 are sub-pixels. In another embodiment, each of the second pixels 221~223 comprises three sub-pixels.

In FIG. 2B, each of the first pixels corresponds to many second pixels. For example, the first pixel 231 corresponds to the second pixels 241~243, wherein the colors of the lights displayed by the second pixels 241~243 are different. In this case, each of the second pixels 241~243 is a sub-pixel. In some embodiments, each of the second pixels 241~243 comprises three sub-pixels. In other embodiments, each of the second pixels 241~244 comprises four sub-pixels, but the disclosure is not limited thereto.

In FIG. 2C, the first pixel 251 corresponds to the second pixels 261~272. In this case, each of the second pixels 261, 264, 267 and 270 displays light, such as red light. Additionally, each of the second pixels 262, 265, 268 and 271 displays light, such as green light. Each of the second pixels 263, 266, 269 and 272 displays light, such as blue light. In this case, each of the second pixels 261~272 is a sub-pixel. In other embodiments, each of the second pixels 261~272 comprises three sub-pixels.

Figure 3A:
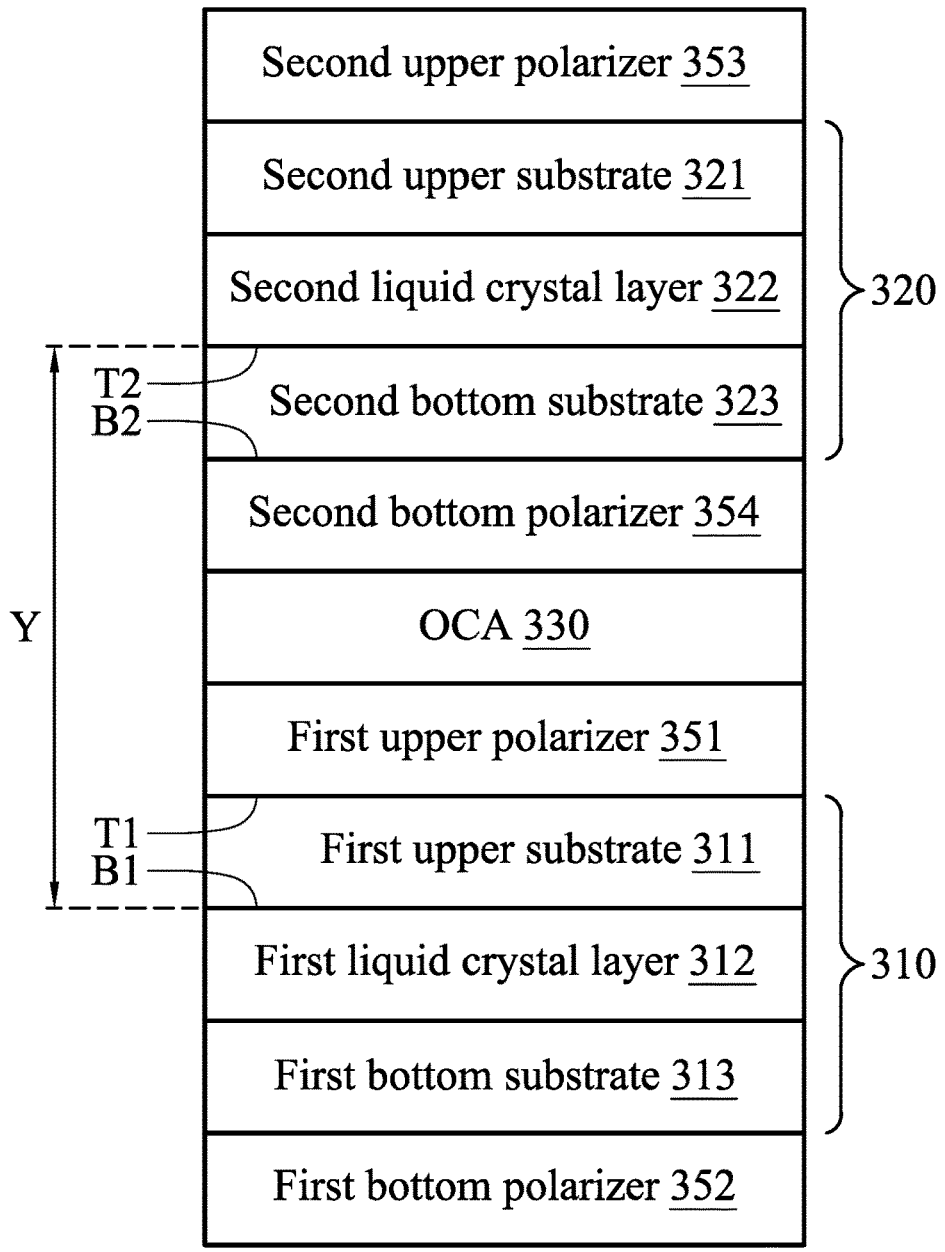
FIG. 3A is a structure schematic diagrams of exemplary embodiments of a first panel and a second panel, according to various aspects of the present disclosure.

FIG. 3A is a structure schematic diagram of an exemplary embodiment of the first panel and the second panel, according to various aspects of the present disclosure. The first panel 310 comprises a first upper substrate 311, a first liquid crystal layer 312 and a first bottom substrate 313. The first liquid crystal layer 312 is disposed between the first upper substrate 311 and the first bottom substrate 313. The first bottom substrate 313 is disposed on a first bottom polarizer 352. The first liquid crystal layer 312 is disposed on the first bottom substrate 313. The first upper substrate 311 is disposed on the first liquid crystal layer 312. In one embodiment, each of the first upper substrate 311 and the first bottom substrate 313 is a flexible substrate. In the present disclosure, the materials of the first upper substrate 311 and the first bottom substrate 313 are not limited. In one embodiment, the materials of the first upper substrate 311 or the first bottom substrate 313 may be plastic films, such as polyimide (PI), polyethylene terephthalate (PET) or polycarbonate (PC), or other suitable materials, but the disclosure is not limited thereto. In another embodiment, each of the first upper substrate 311 or the first bottom substrate 313 may be flat glass or 3D glass, or other suitable materials, but the disclosure is not limited thereto.

The second panel 320 comprises a second upper substrate 321, a second liquid crystal layer 322 and a second bottom substrate 323. The second liquid crystal layer 322 is disposed between the second upper substrate 321 and the second bottom substrate 323. The second upper substrate 321 is disposed under a second upper polarizer 353. The second liquid crystal layer 322 is disposed under the second upper substrate 321. The second bottom substrate 323 is disposed under the second liquid crystal layer 322. In one embodiment, each of the second upper substrate 321 and the second bottom substrate 323 is a flexible substrate. In the present disclosure, the materials of the second upper substrate 321 and the second bottom substrate 323 are not limited. In one embodiment, the materials of the second upper substrate 321 or the second bottom substrate 323 may be plastic films, such as PI, PET or PC. In another embodiment, each of the second upper substrate 321 or the second bottom substrate 323 may be flat glass or 3D glass, or other suitable materials, but the disclosure is not limited thereto.

In this embodiment, a second bottom polarizer 354, an adhesive 330 and a first upper polarizer 351 are disposed between the first panel 310 and the second panel 320. The adhesive 330 may be an optical clear adhesive (OCA), an non-liquid film type adhesive, or other suitable materials, and the materials may be re-workablility and can configured to non-even surfaces, Superior optical properties, or durability. The first upper polarizer 351 is disposed on the first upper substrate 311. The second bottom polarizer 354 is disposed under the second bottom substrate 323. The adhesive 330 is configured to stick the second bottom polarizer 354 and the first upper polarizer 351 together.

As shown in FIG. 3A, the first upper substrate 311 comprises a first surface T1 and a second surface B1. The first surface T1 is opposite to the second surface B1. In this embodiment, the second surface B1 is closer to the first liquid crystal layer 312 than the first surface T1. The distance between the second surface B1 and the first liquid crystal layer 312 is shorter than the distance between the first surface T1 and the first liquid crystal layer 312. Similarly, the second bottom substrate 323 comprises a third surface T2 and a fourth surface B2. The third surface T2 is opposite to the fourth surface B2. In this embodiment, the third surface T3 is closer to the second liquid crystal layer 322 than the fourth surface B2. The distance between the third surface T2 and the second liquid crystal layer 322 is shorter than the distance between the fourth surface B2 and the second liquid crystal layer 322. The distance Y occurs between the third surface T2 and the second surface B1. The distance Y is the sum of the thicknesses of the second bottom substrate 323, the second bottom polarizer 354, the adhesive 330, the first upper polarizer 351 and the first upper substrate 311. In one embodiment, the distance Y is approximately in 2000 um~2100 um, but the disclosure is not limited thereto. In another embodiment, a color filter layer may be disposed between the second bottom substrate 323 and the second upper substrate 321, for example the color filter layer may be disposed on array substrate (COA), or the color filter layer may be disposed on the other substrate of the second panel 320, but the disclosure is not limited thereto.

Figure 3B:
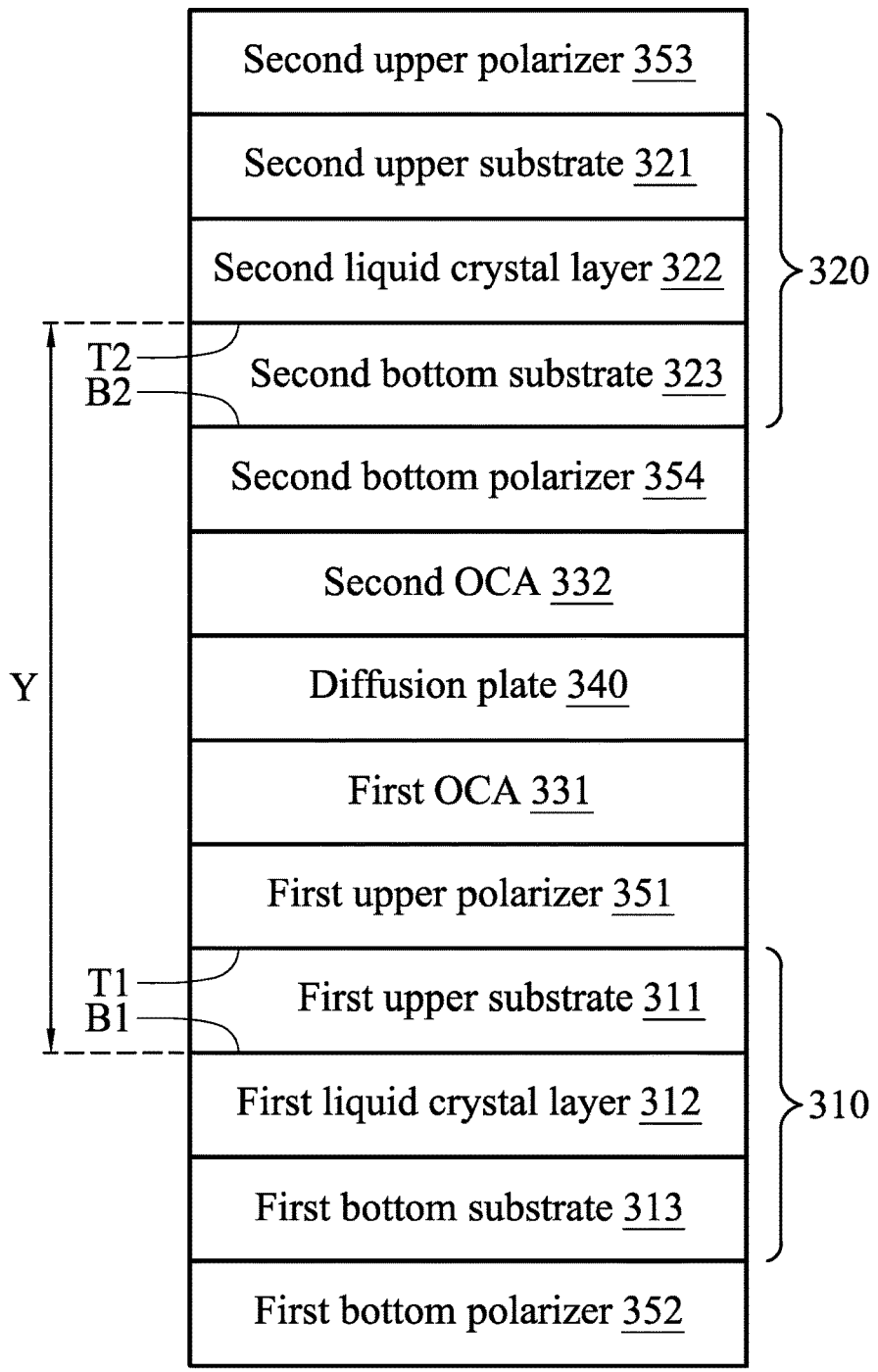
FIG. 3B is a structure schematic diagrams of exemplary embodiments of a first panel and a second panel, according to various aspects of the present disclosure.

FIG. 3B is a structure schematic diagram of an exemplary embodiment of the first panel and the second panel, according to various aspects of the present disclosure. FIG. 3B is similar to FIG. 3A except for the addition of a diffusion plate 340, the diffusion plate 340 is disposed between the first panel 310 and the second panel 320. A first adhesive 331 disposed between the first panel 310 and the diffusion plate 340. A second adhesive 332 disposed between the second panel 320 and the diffusion plate 340. As shown in FIG. 3B, a first adhesive 331 is configured to adhere to the diffusion plate 340 and the first upper polarizer 351. A second adhesive 332 is configured to adhere to the diffusion plate 340 and the second bottom polarizer 354. The first adhesive 331 or the second adhesive 332 may be an optical clear adhesive (OCA) or other suitable material. When the resolutions of the first panel 310 or the second panel 320 are increased. The interference fringes may be produced between a first image displayed by the first panel 310 and a second image displayed by the second panel 320. In this embodiment, the diffusion plate 340 is configured to avoid the occurrence of the interference fringes. In another embodiment, the diffusion plate 340 is configured to unify the brightness of the lights derived from the first panel 310. Main material of diffusion plate 340 may be PP, PET, PS, PC, PMMA, but the disclosure is not limited thereto. In this embodiment, the distance Y is the sum of the thicknesses of the second bottom substrate 323, the second bottom polarizer 354, the second adhesive 332, the diffusion plate 340, the first adhesive 331, the first upper polarizer 351 and the first upper substrate 311.

Figure 4A:
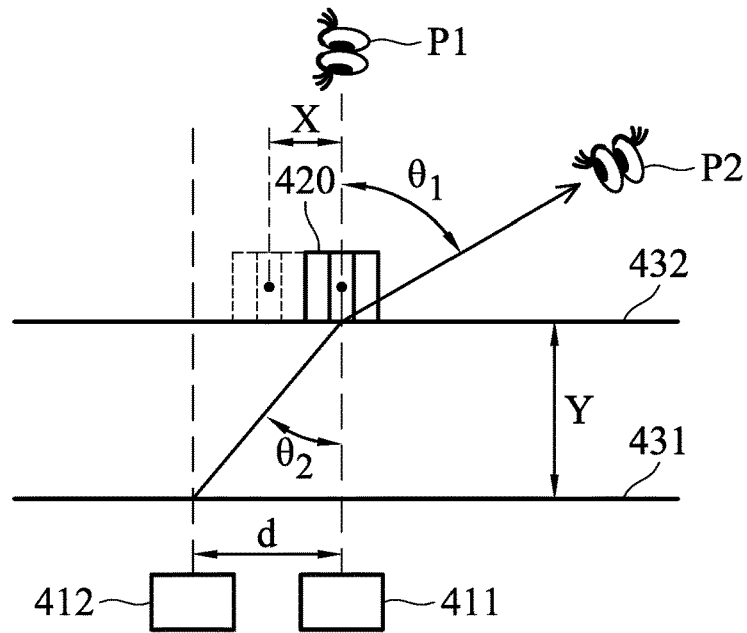
FIG. 4A shows corresponding relationships of exemplary embodiments of the first pixels and the second pixels, according to various aspects of the present disclosure.

FIG. 4A shows a corresponding relationship of the first pixels and the second pixels, according to various aspects of the present disclosure. For clarity, a first panel 431 and a second panel 432 are shown. The first panel 431 comprises a first pixel 411 and a first pixel 412. The second panel 432 comprises a second pixel 420. In this embodiment, the second pixel 420 comprises three sub-pixels. Since the features of the first panel 431 and the second panel 432 are the same as the features of the first panel 120 and the second panel 130 shown in FIG. 1, the descriptions of the first panel 431 and the second panel 432 are omitted.

As shown in FIG. 4A, when a user looks at the second panel 432 in the position P1, the first pixel 411 of the first panel 431 needs to be turned on such that the light passes through the first pixel 411, and then the user is capable of seeing the color displayed by the second pixel 420 of the second panel 432. However, when the user looks at the second panel 432 in the position P2, the first pixel 412 of the first panel 431 needs to be turned on such that the light passes through the first pixel 412, and then the user is capable of seeing the color of the light passing through the second pixel 420 of the second panel 432. The angle $\theta_1$ between the position P1 and the position P2 is referred to as the viewing angle.

Figure 4B:
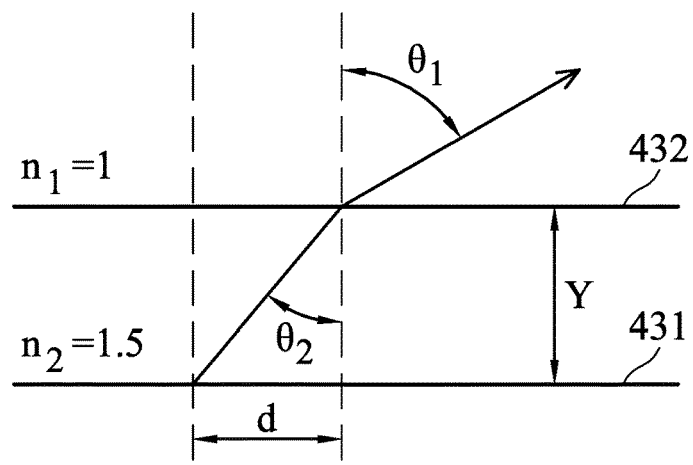
FIG. 4B shows corresponding relationships of exemplary embodiments of the first pixels and the second pixels, according to various aspects of the present disclosure.

The pixels between the first pixel 411 and the first pixel 412 need to be turned on so that the user is capable of seeing the color of the light passing through the second pixel 420 when the user is standing in any position within the angle $\theta_1$. In one embodiment, the pixels between the first pixel 411 and the first pixel 412 are integrated together with the first pixel 411 and the first pixel 412 into a single pixel. FIG. 4B shows how the number of pixels in the first panel 431 and the number of pixels in the second panel 432 are calculated. Assuming the medium, such as the second bottom substrate 323 shown in FIG. 3A, the second bottom polarizer 354, the adhesive 330, the first upper polarizer 351 or the first upper substrate 311, disposed between the first panel 431 and the second panel 432 has an equivalent refraction index $n_2$, the equivalent refraction index $n_2$ is equal to 1.5. Additionally, assume that the medium outside of the second panel 432 is air, and the equivalent refraction index $n_1$ of the air is equal to 1.5.

According to Snell's Law, the relationship between the refraction index $n_1$ and the refraction index $n_2$ is expressed by the following the equation (1):

$$n_1 \sin \theta_1 = n_2 \sin \theta_2 \qquad (1)$$

Wherein $\theta_1$ is the angle of refraction when the light travels through the second pixel 420, $\theta_2$ is the angle of incidence when the light enters the second pixel 420. The distance d between the first pixel 411 and the first pixel 412 is expressed by the following equation (2):

$$d = \tan \theta_2 \times Y \qquad (2)$$

If we substitute equation (1) with equation (2), the substituted result is expressed by the following equation (3):

$$d = \tan\left[\sin^{-1}\left(\sin\theta_1 \times \frac{n_1}{n_2}\right)\right] \times Y \qquad (3)$$

Assume that the maximum value of the viewing angle $\theta_1$ is 85, the refraction index $n_1$ is 1 and the refraction index $n_2$ is 1.5. The angle $\theta_1$, the refraction index $n_1$ and the refraction index $n_2$ are substituted with equation (3). The substituted result is expressed by the following equation (4):

$$d = 0.89Y \qquad (4)$$

Equation (4) is divided by the pixel pitch X of the second pixel 420. The divided result indicates the maximum value of the ratio relationship of the number of first pixels of the first panel 431 and the number of second pixels of the second panel 432. The divided result is expressed by the following equation (5):

$$\frac{R_{432}}{R_{431}} = 0.89^2 \times \left(\frac{Y}{X}\right)^2 \quad (5)$$

Wherein $R_{431}$ represents the number of the first pixels of first panel 431, and $R_{432}$ represents the number of second pixels of the second panel 432. In one embodiment, the pixel pitch X is the distance from the center of the second pixel 420 to the center of the next second pixel.

Assume that the minimum value of the viewing angle $\theta_1$ is 40, the refraction index $n_1$ is 1 and the refraction index $n_2$ is 1.5. The angle $\theta_1$, the refraction index $n_1$ and the refraction index $n_2$ are substituted with equation (3). The substituted result is expressed by the following equation (6):

$$d = 0.47Y \quad (6)$$

Equation (6) is divided by the pixel pitch X of the second pixel 420. The divided result indicates the minimum value of the ratio relationship of the number of first pixels of the first panel 431 and the number of second pixels of the second panel 432. The divided result is expressed by the following equation (5):

$$\frac{R_{432}}{R_{431}} = 0.47^2 \times \left(\frac{Y}{X}\right)^2 \quad (5)$$

Equation (5) and equation (7) are combined to obtain the range of the ratio relationship of the number of first pixels of the first panel 431 and the number of second pixels of the second panel 432. The combined result is pressed by the following equation (8):

$$0.2209 \times \left(\frac{Y}{X}\right)^2 \leq \frac{R_{432}}{R_{431}} \leq 0.7921 \times \left(\frac{Y}{X}\right)^2 \quad (8)$$

Y is a distance between the second surface B1 and the third surface T2, X is a pixel pitch between the second pixels, $R_1$ is the number of the first pixels, and $R_2$ is a number of the second pixels.

In one embodiment, the pixel pitch of the second pixel 420 is between 80 um and 90 um (80 um~90 um). The designer determines the ratio relationship of the number of first pixels of the first panel 431 and the number of second pixels of the second panel 432 according to equation (8). In one embodiment, a single first pixel may correspond to 18×18 second pixels.

Figure 5:
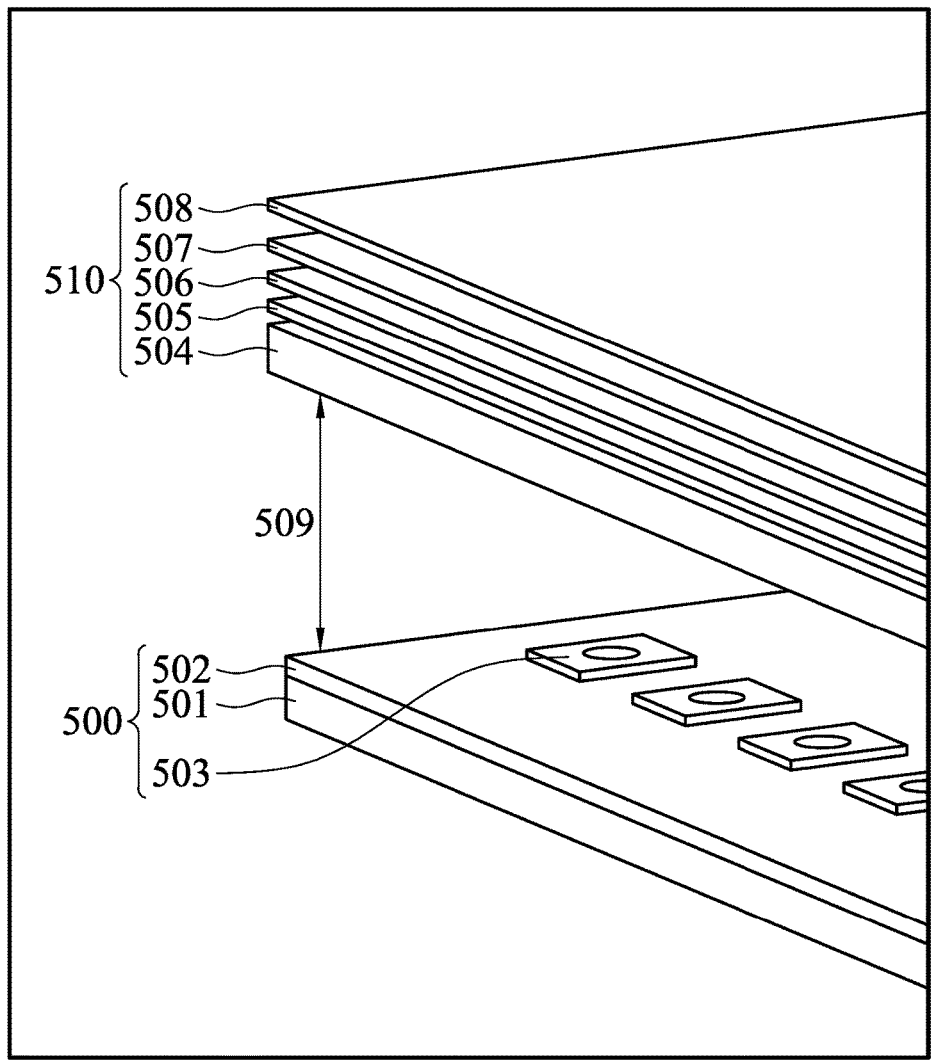
FIG. 5 is a schematic diagram of an exemplary embodiment of a backlight plate, according to various aspects of the present disclosure.

FIG. 5 is a schematic diagram of an exemplary embodiment of the backlight plate, according to various aspects of the present disclosure. The backlight plate 500 comprises a substrate 501, a reflecting medium 502, a plurality of luminescent elements 503. The reflecting medium 502 is disposed between the substrate 501 and the plurality of luminescent elements 503. The kind of substrate 501 that can be used is not limited in the present disclosure. In one embodiment, the substrate 501 is a flexible printed circuit board (FPCB). The reflecting medium 502 is disposed on the substrate 501. In one embodiment, the reflecting medium 502 is a reflector. In this embodiment, the reflecting medium 502 has a plurality of openings. Each of the openings is configured to hold a luminescent element. In one embodiment, each of the luminescent elements 503 is a light-emitting diode (LED), or light-emitting diode (LED) with QD materials, or light-emitting diode (LED) with light conversion materials, for example, QD materials or light conversion materials may be encapsulate in LED, but the disclosure is not limited thereto.

In this embodiment, an optical film group 510 is disposed on the backlight plate 500. As shown in FIG. 5, the optical film group 510 comprises a diffusion substrate 504, a diffusion film 505, a first brightness enhancement film (BEF) 506, a second BEF 507 and a reflective BEF 508. The first brightness enhancement film (BEF) 506 is disposed between the first panel and the backlight plate 500. The diffusion film 505 is disposed between the first BEF 506 and the backlight plate 500. The reflective BEF 508 is disposed between the first panel and the first BEF 506. The second BEF 507 is disposed between the first BEF 506 and the reflective BEF 508.

The diffusion substrate 504 is configured to unify the lights derived from the luminescent elements 503 to avoid some of the lights being especially brighter than the others. In this embodiment, a gap 509 occurs between the diffusion substrate 504 and the reflecting medium 502 of backlight plate 500. To form the gap 509, the diffusion substrate 504 is a hard substrate. The diffusion film 505 is disposed on the diffusion substrate 504 to again unify the intensity of the lights passing through the diffusion substrate 504. In one embodiment, the diffusion substrate 504 or the diffusion film 505 can be omitted.

The first BEF 506 is disposed on the diffusion film 505 to change the direction of the lights passing through the diffusion film 505. In this embodiment, the first BEF 506 comprises a plurality of first patterns. Each of the first patterns extends in a first direction.

The second BEF 507 is disposed on the first BEF 506 to change the direction of the lights passing through the first BEF 506. The second BEF comprises a plurality of second patterns. Each of the second patterns extends in a second direction. The second direction is different from the first direction. In this embodiment, the second direction may be perpendicular to the first direction, but the disclosure is not limited thereto.

The reflective BEF 508 is disposed on the second BEF 507 to reflect the lights, which cannot pass through the first bottom polarizer 352 to go back to the backlight plate. After many reflections, the amount of the lights passing through the first bottom polarizer 352 is increased. In one embodiment, the lights passing through the reflective BEF 508 can pass through the first bottom polarizer 352 shown in FIG. 3A. In this case, the reflective BEF 508 is capable of adjusting polarization states of the lights, and the amount of the lights passing through the first bottom polarizer 352 is increased.

Figure 6A:
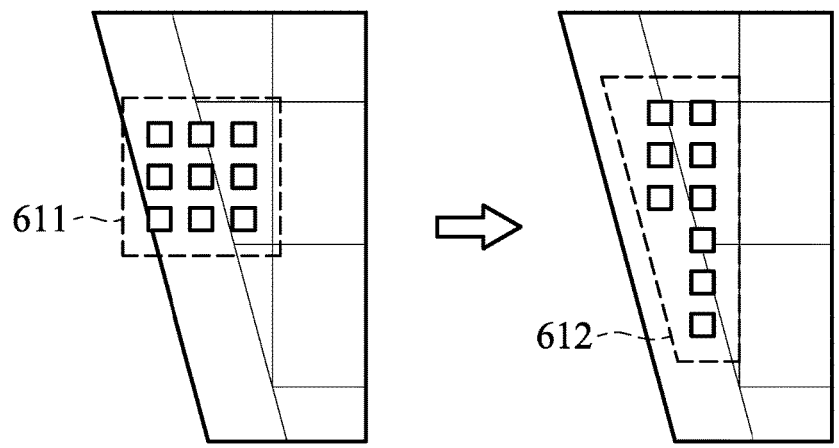
FIG. 6A is a schematic diagrams of exemplary embodiments of light emission zones, according to various aspects of the present disclosure.

FIG. 6A is a schematic diagram of an exemplary embodiment of the light emission zones, according to various aspects of the present disclosure. The luminescent elements in light emission zone 611 form a rectangle. However, because the shape of the backlight plate is not rectangular, or the backlight plate has a solid bending part, a portion of the luminescent elements in the light emission zone 611 is out of the boundary of the backlight plate. Therefore, the positions of the portion of the luminescent elements in the light emission zone 611 need to be adjusted. As shown in FIG. 6A, after the positions of the portion of the luminescent elements in the light emission zone 611 are adjusted, the shape of the light emission zone 612 is a trapezoid, but the disclosure is not limited thereto. The shape of the adjusted light emission zone 612 may be any shape. In other embodiments, when a light emission zone is located in the center of the backlight plate, the probability that a portion of the luminescent elements of the light emission zone is out of the boundary of the backlight plate is reduced. Therefore, the positions of the luminescent elements of the emission area located in the center of the backlight plate do not need to be adjusted. In one embodiment, the arrangement of the luminescent elements of the light emission zone located in the center of the backlight plate is different from the arrangement of the luminescent elements of the light emission zone near the boundary of the backlight plate.

Figure 6B:
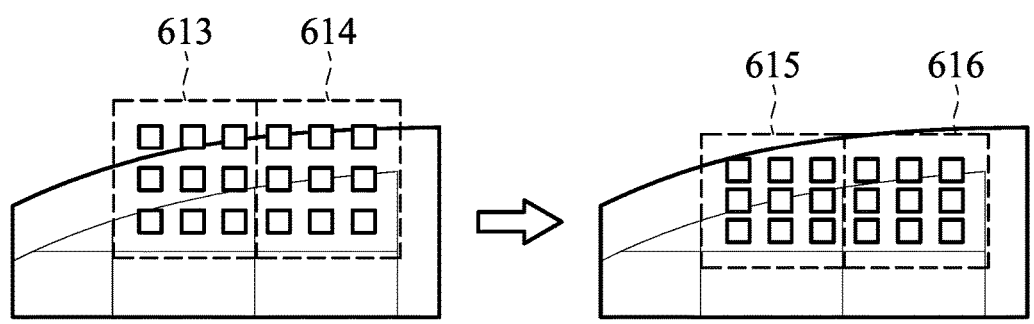
FIG. 6B is a schematic diagrams of exemplary embodiments of light emission zones, according to various aspects of the present disclosure.

FIG. 6B is a schematic diagram of another exemplary embodiment of the light emission zones, according to various aspects of the present disclosure. When the shape of the backlight plate is not rectangular, or the backlight plate has a solid bending part, a portion of the luminescent elements in the light emission zone 613 and a portion of the luminescent elements in the light emission zone 614 are out of the boundary of the backlight plate. To solve the above problem, in one embodiment, the pitches between the luminescent elements of the light emission zone 613 and the pitches between the luminescent elements of the light emission zone 614 are adjusted. The light emission zone 615 indicates an adjustment result of the light emission zone 613. The light emission zone 616 indicates an adjustment result of the light emission zone 614. In other embodiments, when a light emission zone is near the center of the backlight plate, the probability that a portion of the luminescent elements of the light emission zone is out of the boundary of the backlight plate is low. Therefore, the pitches between the luminescent elements of the light emission zone near the center of the backlight plate may be higher than the pitches between the luminescent elements of the light emission zone near the boundary of the backlight plate.

Note that the above element sizes, element parameters, and element shapes are not limitations of the present disclosure. Those skilled in the art can adjust these settings or values according to different requirements. It should be understood that the display device and the structure of the display device of the present disclosure are not limited to the configurations of FIGS. 1, 2A~2C, 3A~3B, 4A~4B, 5 and 6A~6B. The present disclosure may merely include any one or more features of any one or more embodiments of FIGS. 1, 2A~2C, 3A~3B, 4A~4B, 5 and 6A~6B. In other words, not all of the features shown in the figures should be implemented in the display device and the structure of the display device of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described by way of example, it is to be understood that the disclosure is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A display device, comprising:
a backlight plate comprising a plurality of light emission zones;
a first panel disposed on the backlight plate and comprising a plurality of first pixels;
a second panel disposed on the first panel and comprising a plurality of second pixels; and
a diffusion plate disposed between the first panel and second panel;
wherein a number of the light emission zones is less than or equal to a number of the first pixels, and the number of the first pixels is less than a number of the second pixels,
wherein the first panel comprises a first upper substrate, a first liquid crystal layer and a first bottom substrate, the first liquid crystal layer is disposed between the first upper substrate and the first bottom substrate, the first upper substrate comprises a first surface and a second surface, and the second surface is closer to the first liquid crystal layer than the first surface,
wherein the second panel comprises a second upper substrate, a second liquid crystal layer and a second bottom substrate, the second liquid crystal layer is disposed between the second upper substrate and the second bottom substrate, the second upper substrate comprises a third surface and a fourth surface, and the third surface is closer to the second liquid crystal layer than the fourth surface,
wherein a ratio relationship between the number of the first pixels and the number of the second pixels is $$0.2209 \times \left(\frac{Y}{X}\right)^2 \leq \frac{R_2}{R_1} \leq 0.7921 \times \left(\frac{Y}{X}\right)^2,$$

wherein Y is a distance between the second surface and the third surface, X is a pixel pitch between the second pixels, R1 is the number of the first pixels, and R2 is the number of the second pixels, and
wherein Y is in 2000 um~2100 um.

2. The display device as claimed in claim 1, wherein a resolution of the backlight plate is less than or equal to a resolution of the first panel, and the resolution of the first panel is less than a resolution of the second panel.

3. The display device as claimed in claim 1, wherein a brightness of a first light emission zone of the plurality of light emission zones is different from a brightness of a second light emission zone of the plurality of light emission zones when one of the first light emission zone and the second first light emission zone is activated.

4. The display device as claimed in claim 1, wherein the second panel further comprises a color filter layer disposed between the second bottom substrate and the second upper substrate.

5. The display device as claimed in claim 1, further comprising:
a first brightness enhancement film disposed between the backlight plate and the first panel, wherein the first brightness enhancement film comprises a plurality of first patterns extending along a first direction; and
a second brightness enhancement film disposed between the first brightness enhancement film and the first panel, wherein the second brightness enhancement film comprises a plurality of second patterns extending along a second direction, and the second direction is different from the first direction.

6. The display device as claimed in claim 1, wherein the backlight plate comprises a substrate, a reflecting medium and a plurality of luminescent elements, the reflecting medium is disposed between the substrate and the plurality of luminescent elements, and the substrate is a flexible printed circuit board.

7. The display device as claimed in claim 1, wherein at least one of the first panel or the second panel is not rectangular.

8. The display device as claimed in claim 1, wherein each of the second pixels comprises three sub-pixels.

9. The display device as claimed in claim 1, further comprising:
a first adhesive disposed between the first panel and the diffusion plate; and
a second adhesive disposed between the second panel and the diffusion plate.

10. The display device as claimed in claim 9, the first adhesive or the second adhesive is an optical clear adhesive.

11. The display device as claimed in claim 1, wherein each of the light emission zones comprises a plurality of luminescent elements, an arrangement of the luminescent elements of a first light emission zone of the light emission zones is different from an arrangement of the luminescent elements of a second light emission zone of the light emission zones.

12. The display device as claimed in claim 11, wherein the luminescent elements are activated according to an amplitude or a duty cycle of a driving signal.

13. The display device as claimed in claim 12, wherein the driving signal is a current signal or a voltage signal.

14. The display device as claimed in claim 1, wherein at least one of the first panel and the second panel is flexible.

15. The display device as claimed in claim 14, wherein at least one of the first panel and the second panel comprises a 3D glass.

16. The display device as claimed in claim 1, further comprising:
an optical film group disposed on the backlight plate, wherein the optical film group comprising:
a first brightness enhancement film disposed between the first panel and the backlight plate;
a diffusion film disposed between a first brightness enhancement film and the backlight plate;
a reflective brightness enhancement film disposed between the first panel and the first brightness enhancement film; and
a second brightness enhancement film disposed between the first brightness enhancement film and the reflective brightness enhancement film.

17. The display device as claimed in claim 16, wherein the diffusion film is disposed on a diffusion substrate, and there is a gap between the diffusion substrate and a reflecting medium of the backlight plate.

18. The display device as claimed in claim 16, further comprising:
a polarizer disposed between the reflective brightness enhancement film and the first panel.

* * * * *